United States Patent
Arroubi et al.

(10) Patent No.: US 6,252,372 B1
(45) Date of Patent: Jun. 26, 2001

(54) METHOD AND SYSTEM FOR VARYING AND REGULATING A MOTOR SPEED

(75) Inventors: Mustapha Arroubi, Villons les Buissons; Jean-Luc Alain Henri Leroy, Lingevres, both of (FR)

(73) Assignee: Moulinex S.A., Paris (FR)

( * ) Notice: Subject to any disclaimer, the term of this patent is extended or adjusted under 35 U.S.C. 154(b) by 0 days.

(21) Appl. No.: 09/485,537

(22) PCT Filed: Aug. 13, 1998

(86) PCT No.: PCT/FR98/01801

§ 371 Date: Mar. 30, 2000

§ 102(e) Date: Mar. 30, 2000

(87) PCT Pub. No.: WO99/09643

PCT Pub. Date: Feb. 25, 1999

(30) Foreign Application Priority Data

Aug. 14, 1997 (FR) .................................................. 97 10369

(51) Int. Cl.[7] .................................................. H02P 7/42
(52) U.S. Cl. ........................ 318/800; 318/810; 318/811; 318/812
(58) Field of Search .................... 318/825, 826, 318/729, 808–812, 800

(56) References Cited

U.S. PATENT DOCUMENTS

| | | | |
|---|---|---|---|
| 3,673,479 | * 6/1972 | Horton | 318/208 |
| 3,809,984 | * 5/1974 | Hoge | 318/244 |
| 4,008,421 | * 2/1977 | Bird | 318/171 |
| 4,150,303 | * 4/1979 | Armstrong | 307/140 |
| 4,158,796 | * 6/1979 | Kosak et al. | 318/245 |
| 4,228,383 | * 10/1980 | Soeda et al. | 318/245 |
| 4,348,625 | * 9/1982 | Sharp | 318/757 |
| 4,441,061 | * 4/1984 | Yoshida et al. | 318/329 |
| 4,489,263 | * 12/1984 | Potter et al. | 318/727 |
| 4,628,233 | * 12/1986 | Bradus | 318/306 |
| 5,412,303 | 5/1995 | Wernicki . | |
| 5,760,553 | * 6/1998 | Astic et al. | 318/244 |
| 5,764,021 | * 6/1998 | Gutsche | 318/727 |

FOREIGN PATENT DOCUMENTS

| | | |
|---|---|---|
| 2 517 139 | 5/1983 | (FR) . |
| 2 526 243 | 11/1983 | (FR) . |
| 2 189 910 | 11/1987 | (GB) . |

* cited by examiner

Primary Examiner—Robert E. Nappi
Assistant Examiner—Rita Leykin
(74) Attorney, Agent, or Firm—Young & Thompson

(57) ABSTRACT

The invention concerns a method for varying and regulating the speed of a motor powered from a voltage source via a triac, comprising, at least once every alternating voltage interval, the following steps: computing a surface value ($S_I$) corresponding to the current absorbed ($I(M)$) in a time window (FT) defined between a current switching-on time ($t_i$) and a following current switching-off time ($t_f$); computing an interval of the next triac-blocking time (t'); and controlling the starting of the triac when the blocking time (t') has elapsed. The invention is useful in particular for household electric and house automation appliances operating at variable speed.

10 Claims, 2 Drawing Sheets

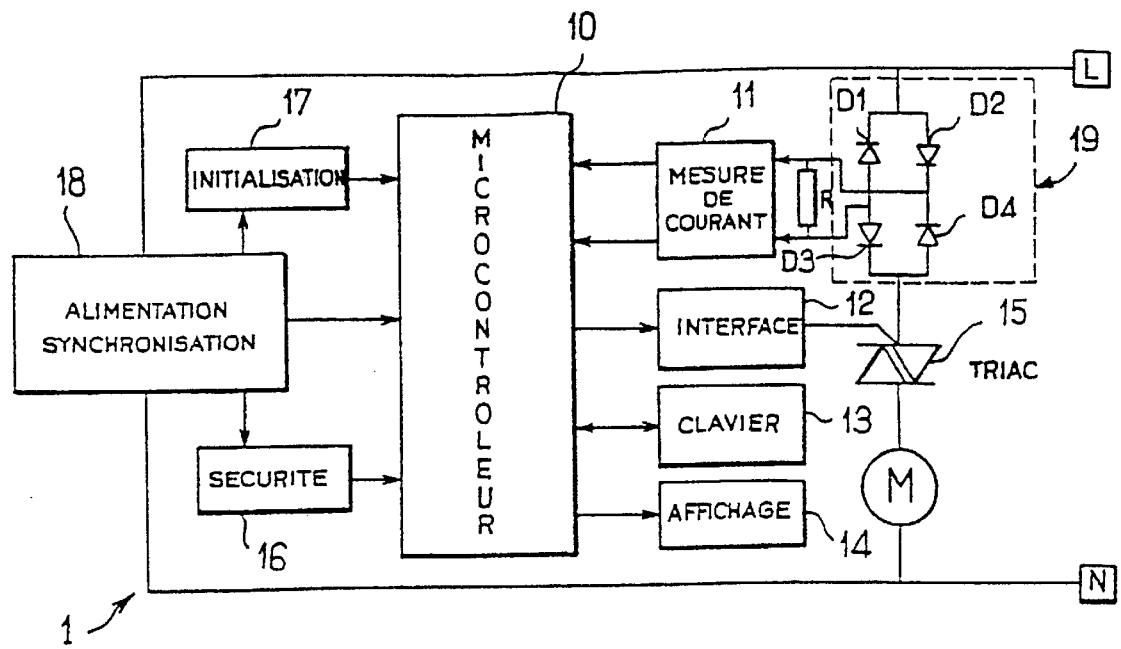
FIG_1
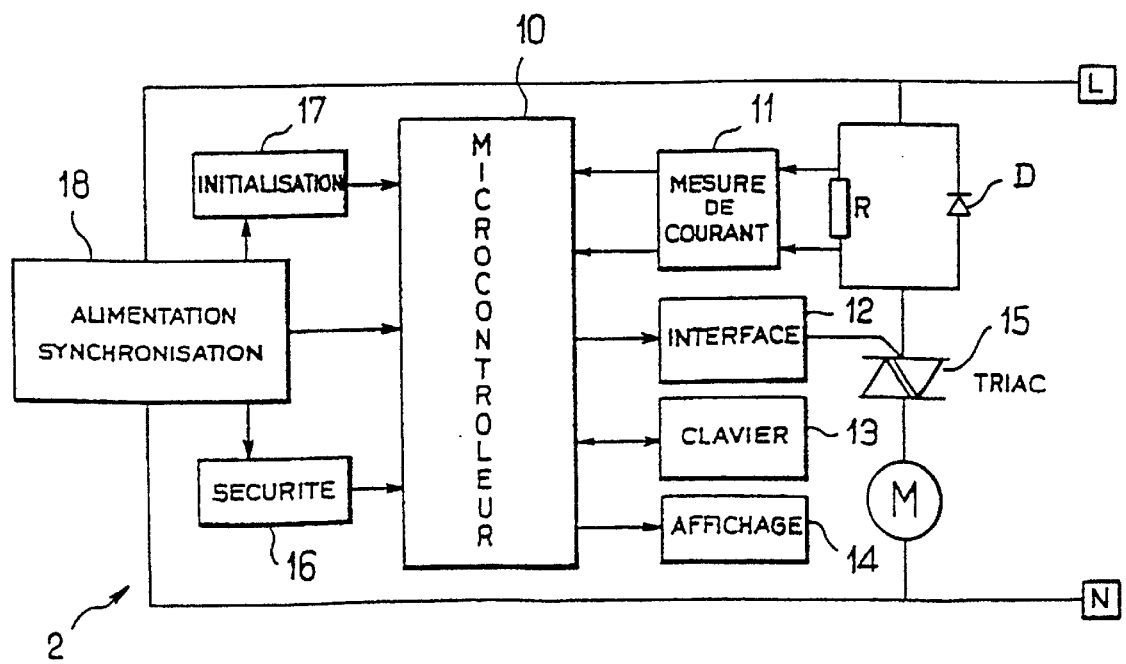
FIG_2

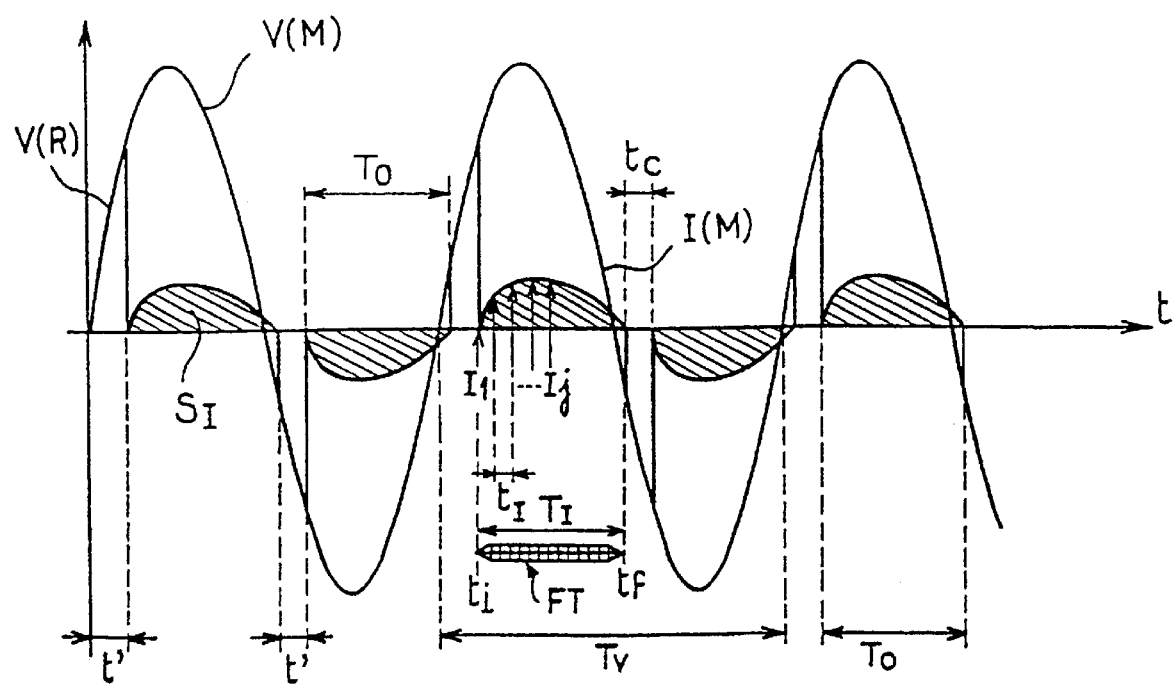
FIG_3

METHOD AND SYSTEM FOR VARYING AND REGULATING A MOTOR SPEED

The present invention relates to a process for the variation and regulation of the speed of a motor. It also relates to a system for the practice of this process. It is more particularly concerned with monophase AC motors such as universal motors.

Present processes for the regulation of the speed of a motor is either a direct measurement of the speed, or an estimation of the speed from observation and measurement of the physical parameters such as a difference of potential proportional to the speed, or the current intensity drawn by the motor. In this latter case, it is a matter of measuring at the terminals of a shunt placed in series with the motor, a difference of potential proportional to the drawn current. The signal is then integrated and then compared with a reference voltage. The result of this comparison leads to a slowing of triggering of the triac which permits compensating variations of speed resulting from an overload or a loss of load of the motor. This regulation process is widely used and particularly in integrated circuits that are specialized or dedicated to speed regulation.

The object of the present invention is to provide a new process for the regulation of speed which offers a greater flexibility of use than the present processes, whilst costing less.

This object is achieved with a process to cause to vary and to regulate the speed of a motor supplied from an AC source via switch means controlled to apply to this motor a voltage of variable waveform, comprising an adjustment of the periodical instance of triggering said controlled switches.

According to the invention, this process comprises moreover at least one time per period of the alternating voltage, the following steps:
  a surface quantity is calculated corresponding to the current drawn in a time window defined between an instant of establishing the current and a following instant of extinguishing this current;
  a duration of the next time for blocking the control switch means is computed,
  and the triggering of said switch means is controlled at the end of this blocking time.

There is thus obtained with the process according to the invention a better reliability of taking account of the physical parameter which constitutes the current intensity drawn by the motor. This process moreover offers the possibility of controlling a keyboard, a display, or any other safety function or member. There can thus be provided the possibility of adjusting the speed by use of a keyboard.

Speeds or sequences of operation can be preprogrammed. The regulation process according to the invention can be used for low speeds. There can moreover be provided a limitation of the maximum load current and the detection of the condition of the triac (in short circuit or in open circuit). It is to be noted that the regulation of the speed obtained by the process according to the invention will be more effective than that obtained with the present regulation processes.

The computation of the surface quantity is preferably carried out in the following manner:
  a plurality of samples are taken of the current intensity drawn by the motor, in a time window comprised between an instant of establishing the current and an instant of extinguishing this current;
  the elements of surface are computed from these taken samples; and
  the summation of the surface elements is carried out to determine a quantity of surface corresponding to the current drawn by the motor during a conductive phase of the controlled switch means.

In one preferred embodiment of the process according to the invention, there is calculated a preliminary duration t' of the next time of blocking the control switch means by applying the following relationship:

$$t' = \frac{T_v}{2} - k_v \cdot P_I$$

in which
  $T_v$ is the period of alternating supply voltage,
  $k_v$ is a proportionality factor related to the type of motor and to the desired speed, and
  $P_I$ is a parameter associated with calculated quantity of surface.

For operating regimes in which there is no linear relation between the parameters of quantity of surface and blocking time, the parameter $P_I$ is then preferably used as a pointer for a memory zone containing values of blocking time t' corresponding to values of the surface quantity.

When this linearity is substantially verified, there is then taken for the parameter PI the surface quantity $S_I$.

For transitional regimes in which the motor requires an energy supplement, the process according to the invention comprises moreover preferably a correction of the duration of each next blocking time corresponding to a difference between the next blocking time $t^+$ and the last applied blocking time $t^-$ limited to a predetermined fraction f of the difference between the new computed blocking time t' and the last applied blocking time $t^-$.

Moreover, a computation of the coefficient of energy correction C is carried out by applying the relationship:

$$C = 2\left(1,5 - \sin\left(2 \cdot \pi \cdot \frac{t^+}{T_V}\right)\right)$$

and then the predetermined fraction f is divided by this energy correction coefficient C.

On the contrary, for transitional regimes corresponding to a decrease of the conduction time of the controlled switch means, there can be directly applied the new computed blocking time.

The surface quantity $S_i$ can be computed by applying the following relation:

$$S_i = \left(\frac{I_1 + I_n}{2} + \sum_{j=2}^{j=(n-1)} I_j\right)$$

in which
  $I_1, I_j, \ldots I_n$ represents samplings of the drawn current intensity.

According to another aspect of the invention, there is provided a system to regulate the speed of a motor supplied from a source of alternating voltage via controlled switch means to apply to this motor a voltage of variable waveform, for practicing the process according to the invention, this system comprising:
  means to predetermine the periodic instants of triggering said controlled switch means,
  means to supply control signals for triggering said controlled switch means, and means to measure the current drawn by the motor.

According to the invention, this system comprises moreover control and processing means arranged to:

compute a quantity of surface corresponding to the current drawn in a time window defined between an instant of establishing the current and a following instant of extinguishing this current;

computing a duration of the next time of blocking the controlled switch means, and controlling the triggering of said switch means at the end of this blockage time.

Other particularities and advantages of the invention will become apparent from the following description. In the accompanying drawings, given by way of non-limiting example:

FIG. 1 is a synoptic diagram of a first example of embodiment of a system of speed regulation according to the invention;

FIG. 2 is a synoptic diagram of a second embodiment of a system for speed regulation according to the invention; and FIG. 3 is a chronogram including several characteristic waveforms observed with the process of regulation according to the invention.

There will now be described two examples of embodiment of a system of regulation according to the invention, with reference to FIGS. 1 and 2.

A system of regulation 1 according to the invention is adapted to regulate the speed of a motor M, for example a universal motor, supplied with variable voltage from a monophase alternating source (L, N) by means of triac 15. For measuring current, a double bridge rectifying circuit 19, constituted conventionally by four bridged diodes D1–D4, is disposed in series with the triac 15 and the motor M, and resistance R is connected at the output of this rectifying circuit. The voltage at the terminals of this resistance gives an image of the current passing through the motor M.

The regulation system 1 is constructed about a microcontroller 10 supplied by a supply and synchronization module 18 connected to the alternating source (L, N). The microcontroller 10 receives at its input a signal from an initialization module controlled by the supplying synchronization module 18, and a signal from a safety module 16.

The regulation system 1 moreover comprises a module 11 for measuring current receiving at its input the voltage across the terminals of the resistance R and sending to the microcontroller 10 an input signal representative of the current drawn, an interface module 12 for controlling the triac 15 receiving a control signal emitted by the microcontroller 10, a keyboard 13, and a display module 14. The microcontroller 10 includes an analog-digital conversion function, used to generate internally a digital representation of the current drawn.

There could also be provided, referring to FIG. 2, in which the components and modules common to FIG. 1 are given the same reference numerals, another configuration for measuring the current drawn within a system 2 for regulation of speed according to the invention. In this other configuration, there is carried out with a single diode D a simple alternating rectification of the voltage at the terminals of the resistance R.

There will now be described an embodiment of the regulation process according to the invention, particularly with reference to FIG. 3. This process comprises first of all a computation sequence of the surface quantity $S_I$, which comprises the following steps:

taking a number n of samples of the intensity of current drawn by the motor, between an instant $t_i$ at which the current is established, and an instant $t_f$ of extinction of the current, calculating surface elements, summing the surface elements, computing the surface quantity SI.

As to the current samplings, the sampling period $t_1$ is for example selected to be 50 µs. The samples are taken between instant $t_1$ of establishing the current and the instant $t_f$ of extinction of the current during a sampling period $T_I$. The number n of samples taken during this period can be determined by the relation:

$$n = \frac{T_I}{t_1} + 1$$

The computation of the surface elements $s_1, \ldots, s_{(n-1)}$ is carried out in the following manner:

$$s_1 = t_I \frac{I_1 + I_2}{2}$$

$$s_{(n-1)} = t_I \frac{I_{(n-1)} + I_n}{2}$$

There is then carried out the summation of all the surface elements thus computed:

$$S_{I_1} = \sum_{e=1}^{e=(n-1)} S_e$$

or again $$S_{I_1} = t_I \left( \frac{I_1 + I_n}{2} + \sum_{j=2}^{j=(n-1)} I_j \right)$$

The precision of measurement of surface depends on the value of the sampling period $t_I$. This precision is higher the shorter the sampling period. Moreover, this sampling period is in practice selected to be constant, which permits processing a surface quantity $S_I$ that no longer refers to the parameter $t_I$.

The surface quantity $S_I$ can then be expressed in the following manner:

$$S_I = \left( \frac{I_1 + I_n}{2} + \sum_{j=2}^{j=(n-1)} I_j \right)$$

There will now be described a manner of computing the time of delay to firing of the triac 15. The startup of motor M is carried out in a progressive manner until the surface quantity reaches a minimum value $S_{Imin}$. Beyond this value, the process of regulation according to the invention enters into action by carrying out the following operations:

a) a computation of the surface quantity SI for each period of the sector or each half alternation;

b) a computation of the preliminary duration of the next blocking time of the triac (t') by applying the following relation:

$$t' = \frac{T_v}{2} - k_v \cdot P_I$$

wherein $k_v$ is a proportionality factor connected to the type of motor and to the desired speed, and $P_I$ is a parameter representative of the surface quantity $S_I$, and in the case of a progressive variation of the time of blocking, c) a computation of a coefficient C of energetic correction, and d) the computation of the blocking time effectively applied to the triac.

The parameter $P_I$ corresponds to $S_I$, in the regime of operation in which linearity between the parameters t' and the quantity of surface $S_I$ is verified. In the contrary case, the parameter $P_I$ is used as an indicator of a memory zone containing the blockage time t'.

In a linear regime, the blockage time t' can be determined by the following relation:

$$t' = \frac{T_v}{2} - k_v \left( \frac{I_1 + I_n}{2} + \sum_{j=2}^{j=(n-1)} I_j \right)$$

In practice, so as to avoid any pumping phenomenon of the motor, the correction of the firing time of the triac is carried out in the following manner:
  by successive approaches in the direction of increasing time of conduction of the triac;
  abruptly in the direction of decrease of the conduction time of the triac.

Thus, if the motor needs to be undersupplied, the new starting time can be applied directly without particular precaution. The inertia of the motor generally dampens possible speed variations.

On the contrary, if the motor needs supplemental energy, the new firing time of the triac is introduced in a progressive manner. To do that, the system computes a predetermined fraction f, for example one-eighth, of the difference between the last time $t^-$ of blocking the triac and the new computed blocking time t'. The difference between the last applied blocking time $t^-$ and the fraction thus computed, gives the next provisional time $t^+$ for blocking of the triac. There is thus obtained for the provisional blocking time $t^+$ the following relation:

$t^+ = t^- + f(t' - t^-)$ $t^+ = t^-(1-f) + (f \cdot t')$ or again, $$t^+ = t^-(1-f) + f\left( \frac{T_v}{2} - k_v \left( \frac{I_1 + I_n}{2} + \sum_{j=2}^{j=(n-1)} I_j \right) \right)$$

The computation of the energy correction coefficient C is carried out by applying the following relation:

$$C = 2\left(1,5 - \sin\left(2 \cdot \pi \cdot \frac{t^+}{T_V}\right)\right)$$

The use of this energy correction coefficient permits giving the motor energy proportional to the time of conduction of the triac, independently of the position of this latter on the sinusoidal curve.

The final time $t_c$ of blockage of the triac is thus:

$$t_c = \left(\frac{C-f}{C}\right) t^- + \frac{f}{C}\left( \frac{T_v}{2} - k_v \left( \frac{I_1 + I_n}{2} + \sum_{j=2}^{j=(n-1)} I_j \right) \right)$$

The complete expression of this blockage time $t_c$, as a function of the samplings of current intensity and of the preceding blockage time $t^-$, is given below:

$$t_c = \left( 2\left(1,5 - \sin 2\cdot\pi\cdot(T_v)^{-1}\left(t^-(1-f) + f\left[\frac{T_v}{2} - k_v\left[\frac{I_1+I_n}{2} + \sum_{j=2}^{j=(n-1)} I_j\right]\right]\right)\right)\right)^{(-1)} \times$$

$$\left(\left(\left(2\left(1,5 - \sin 2\cdot\pi\cdot(T_v)^{-1}\left(t^-(1-f) + f\left[\frac{T_v}{2} - k_v\left[\frac{I_1+I_n}{2} + \sum_{j=2}^{j=(n-1)} I_j\right]\right]\right)\right)\right) - f\right)t^- + f\left(\frac{T_v}{2} - k_v\left[\frac{I_1+I_n}{2} + \sum_{j=2}^{j=(n-1)} I_j\right]\right)\right)$$

This computation can be implemented without difficulty in an eight-bit microprocessor such as microprocessor 8051 of the Intel company.

It is to be noted that the steps of the process which have been described are repeated in cyclic fashion, at each alternation or half alternation of the supply voltage. The computing time required by the microprocessor to execute these steps is practically negligible before the wave period of supply voltage. An analog-digital conversion of eight bits of the measurements of current drawn is in principle sufficient to obtain a correct regulation of a motor.

Of course, the invention is not limited to the examples which have been described, and numerous arrangements can be made of these examples without departing from the scope of the invention. Thus, the process according to the invention can be used in supply and regulation systems that are more complex than that which has been described. Moreover, there can be provided other manners of energy correction and progressive variation of the blocking and conduction times.

What is claimed is:

1. Process to vary and regulate the speed of a motor (M) supplied from an alternating voltage source (L, N) via controlled switch means (15) to apply to this motor (M) a voltage (v(M)) of variable waveform, comprising regulation of the periodic instance of triggering said controlled switch means (15), characterized in that it moreover comprises, at least once per period of the alternating voltage, the following steps:

a surface quantity ($S_I$) is computed corresponding to the current drawn (I(M)) in a time window (FT) defined between an instant ($t_i$) of establishing the current and a following instant ($t_f$) of extinction of this current;

a duration of the next time (t') of blocking said controlled switch means (15) is computed, and the triggering of said switch means (15) is controlled at the end of this blockage time (t').

2. Process according to claim 1, characterized in that for the computation of the surface quantity ($S_I$), there are taken a plurality of samplings ($I_1 \ldots I_j \ldots I_n$) of the current intensity (I(M)) drawn by the motor (M), in a time window (FT) comprised between an instant ($t_i$) of establishment of the current and an instant ($t_f$) of extinction of this current;

the surface elements ($s_1, \ldots, s_{n-1}$) are computed from the taken samples, the surface elements ($s_1, \ldots, s_{n-1}$) are summed to determine a surface quantity ($S_I$) corresponding to the current drawn (I(M)) by the motor (M) during a conductive phase of the controlled switch means (15).

3. Process according to claim 1, characterized in that a preliminary duration t' of the next blocking time of the controlled switch means (15) is computed by using the following relation:

$$t' = \frac{T_v}{2} - k_v \cdot P_I$$

in which $T_v$ is the period of the alternating supply voltage, $k_v$ is a proportionality factor connected to the type of motor and to the desired speed, and $P_I$ is a parameter associated with the computed surface quantity.

4. Process according to claim 3, characterized in that the parameter ($P_I$) is used as the indicator of a memory zone containing blockage time values t' corresponding to the values of the surface quantity ($S_I$).

5. Process according to claim 3, corresponding to regimes of operations in which the linearity between the respective parameters of blockage time (t') and surface quantity ($S_I$) is substantially verified, characterized in that the parameter ($P_I$) is substantially equal to the surface quantity ($S_I$).

6. Process according to claim 3, characterized in that, for transitional regimes in which the motor requires an energy supplement, it comprises moreover a correction of the duration of each next blockage time (t'), this correction corresponding to a difference between the next blockage time ($t^+$) and the last applied blockage time ($t^-$) which is limited to a predetermined fraction (f) of the difference between the new computed blockage time (t') and the last applied blockage time ($t^-$).

7. Process according to claim 6, characterized in that it moreover comprises a computation of the coefficient of energy correction (C) by using the relation:

$$C = 2\left(1,5 - \sin\left(2 \cdot \pi \cdot \frac{t^+}{T_V}\right)\right)$$

and in that the predetermined fraction (f) is divided by this energy correction coefficient (C).

8. Process according to claim 3, characterized in that, for transitional regimes corresponding to a decrease of the conductive time of the controlled switch means (15), there is directly applied the new computed blockage time (t').

9. Process according to any claim 2, characterized in that the surface quantity ($S_I$) is computed by using the following relation:

$$S_I = \left(\frac{I_1 + I_n}{2} + \sum_{j=2}^{j=(n-1)} I_j\right)$$

in which $I_1, I_j, \ldots I_n$ represent samplings of the intensity of the drawn current.

10. System (1, 2) to regulate speed of a motor (M) supplied from a source of alternating voltage (L, N) via controlled switch means (15) to apply to this motor (M) a voltage of variable waveform, this system comprising:

means to predetermine the periodic instants of triggering said controlled switch means, means to supply triggering control signals to said controlled switch means, and means (R, 11, 19) to measure the current (I(M)) drawn by the motor (M), characterized in that it moreover comprises control and processing means (10) arranged to:

compute a surface quantity ($S_I$) corresponding to the current drawn during a time window (FT) defined between the instant ($t_i$) of establishment of the current and a following instant ($t_f$) of extension of this current;

compute a next blockage time duration (t', $t_c$) for the controlled switch means (15), and ordering a triggering of said switch means (15) at the end of this blockage time (t', $t_c$).

* * * * *